United States Patent
Shvabsky et al.

(10) Patent No.: US 8,354,006 B1
(45) Date of Patent: Jan. 15, 2013

(54) DEVICE FOR CONTINUOUS PYROLYSIS

(75) Inventors: Oleg Shvabsky, Hallandale Beach, FL (US); Jacob Gitman, Bay Harbor Island, FL (US)

(73) Assignee: Agro-Energy Holdings LLC, Bay Harbor Island, FL (US)

( * ) Notice: Subject to any disclaimer, the term of this patent is extended or adjusted under 35 U.S.C. 154(b) by 0 days.

(21) Appl. No.: 13/135,864

(22) Filed: Jul. 16, 2011

(51) Int. Cl.
*C10B 1/00* (2006.01)

(52) U.S. Cl. ..... 202/105; 202/118; 202/119; 202/267.1; 202/268

(58) Field of Classification Search ................ 202/105, 202/118, 119, 267, 268; 414/197
See application file for complete search history.

(56) References Cited

U.S. PATENT DOCUMENTS

| | | | | |
|---|---|---|---|---|
| 4,247,367 A | * | 1/1981 | Reilly | 202/105 |
| 4,261,795 A | * | 4/1981 | Reilly | 202/118 |
| 4,387,652 A | * | 6/1983 | Cooke et al. | 110/224 |
| 5,167,772 A | * | 12/1992 | Parker, Sr. | 202/105 |

* cited by examiner

*Primary Examiner* — Nina Bhat
(74) *Attorney, Agent, or Firm* — Henry M. Feiereisen LLC

(57) ABSTRACT

A device for pyrolysis of a material has a horizontal receiving chamber, a horizontally moving compressing element compressing the material in the receiving chamber to form a compact body, a horizontal pyrolysis chamber communicating with the receiving chamber and subjecting the compact body to a heat treatment, a separating partition separating the chambers, and a cylinder-piston unit with a compressing plate which, with the closed partition, first compresses the material in the receiving chamber, then after vertically withdrawing the partition, moves the compressed material from the receiving chamber into pyrolysis chamber and is heated there to produce pyrolysis gas.

8 Claims, 6 Drawing Sheets

DEVICE FOR CONTINUOUS PYROLYSIS

BACKGROUND OF THE INVENTION

The present invention relates to devices for pyrolysis for processing of raw materials from used polymeric products for producing synthetic fuels, gasoline, kerosene, diesel fuel, etc. with the use of continuous methods.

In vertical devices of this type charging of materials takes place in its upper part, while the heating is carried out in its lower part, and fractions are additionally introduced so that with a sufficient height of the device gases generated during pyrolysis cannot escape into atmosphere in a continuous process. In a cyclic process the device is fully charged and closed by a cover. In this case it is necessary to use additional units for preparation of raw material for optimal use of the pyrolysis chamber and its supply to a significant height for charging. The existing devices of this type can be further improved.

SUMMARY OF THE INVENTION

It is therefore an object of the present invention to provide a pyrolysis apparatus which is a further improvement of existing apparatuses of this type.

In keeping with these objects and with others which will become apparent hereinafter, one feature of the present invention resides in a device for pyrolysis of a material, comprising a receiving chamber for receiving the material; compressing means compressing the material receiving in said receiving chamber so as to form a compact body; a pyrolysis chamber for subjecting the compact body to a heat treatment to generate a pyrolysis gas; separating means separating said receiving chamber from said pyrolysis chamber and moveable between a closed position in which said separating means separate said receiving chamber from said pyrolysis chamber for compressing the material received in said receiving chamber and open position in which said separating means is withdrawn and open a communication of said receiving chamber with said pyrolysis chamber so that the compact body can move from the former into the latter, said receiving chamber and said pyrolysis chamber being aligned with each other and forming a continuation of each other with substantially identical inner cross sections, so that when the compact body transits from said receiving chamber into said pyrolysis chamber it is in tight connect with inner surfaces of both chambers, which tight contact prevents a flow of a gas from said pyrolysis chamber back into said receiving chamber and to air from said receiving chamber to said pyrolysis chamber.

Another feature of the present invention is that said compacting means is moveable in a first direction to compress the material in said receiving chamber for forming the compact body and thereafter continues its movement in said first direction to displace the compact body into said pyrolysis chamber.

A further feature of the present invention is that means is provided for moving said separating means between said closed and open position in a second direction which is perpendicular to said first direction.

A further feature of the present invention is that said receiving chamber and said pyrolysis chamber have substantially identical inner diameters.

A further feature of the present invention is that means is provided for withdrawing the gas formed from the pyrolysis of the material from said pyrolysis chamber.

A further feature of the present invention is that refrigerating means is provided into which the gas withdrawn from said pyrolysis chamber is supplied and in which it is converted into a pyrolysis liquid, and means for receiving the pyrolysis liquid from said refrigerating means and storing the pyrolysis liquid.

A further feature of the present invention is that withdrawing means is provided withdrawing from said pyrolysis chamber residues formed in said pyrolysis chamber.

A further feature of the present invention is that said withdrawing means includes a withdrawing chamber located downstream of said pyrolysis chamber, further separating means moveable between a closed position in which said further separating means separate said withdrawing chamber and said pyrolysis chamber and an open position in which said further separating means is withdrawn and a communication between said pyrolysis chamber and said withdrawing chamber is established, and cleaning means engaging the residues and moving the latter from the pyrolysis chamber into said withdrawal chamber.

A further feature of the present invention is that said further separating means is displaceable in said second direction, while said cleaning means is displaceable in said first direction.

A further feature of the present invention is that vapor withdrawing means is arranged in said pyrolysis chamber and receiving vapors generated during heating of the compact body in said pyrolysis chamber.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
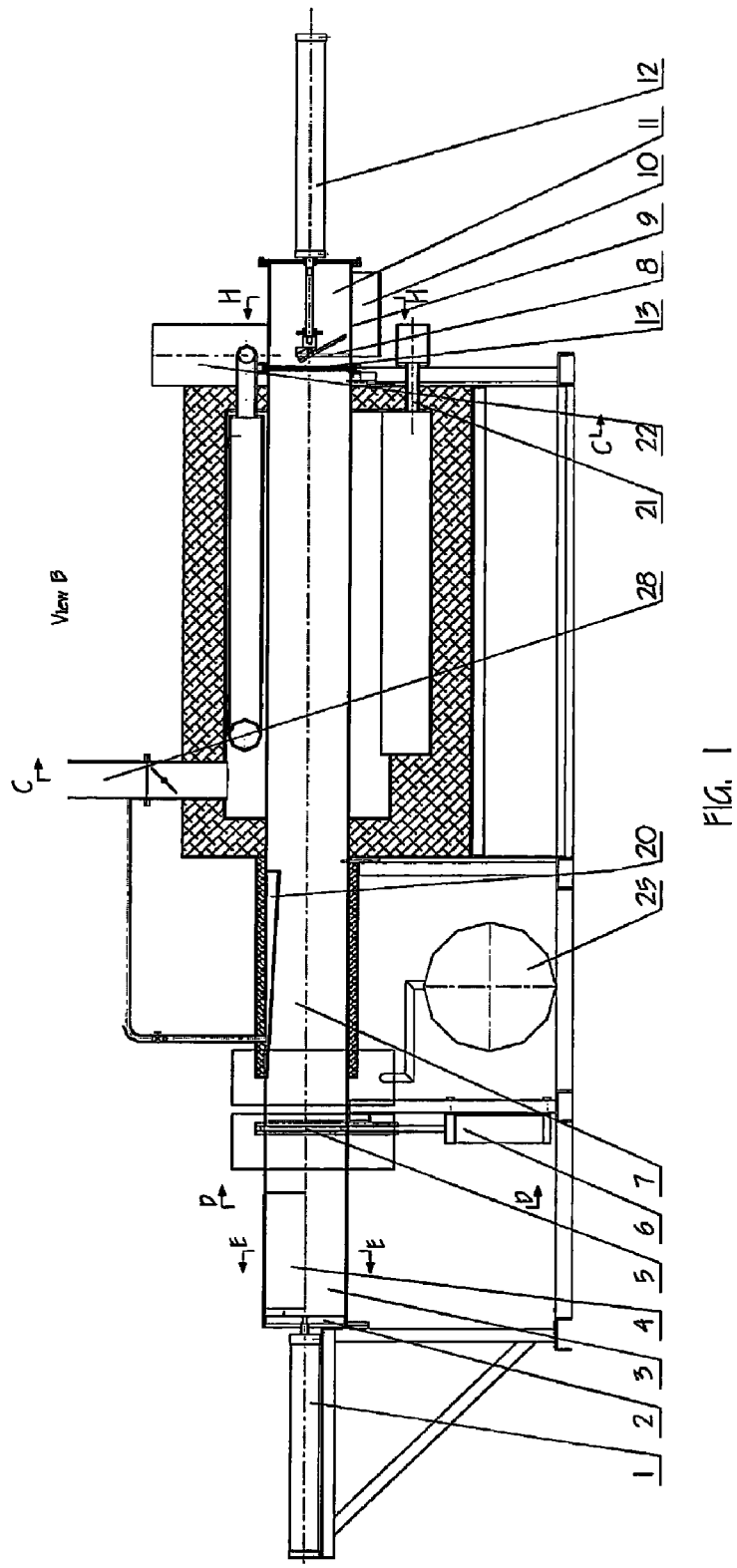
FIG. 1 is an axial cross-section of an apparatus for pyrolysis in accordance with the present invention.
Figure 2:
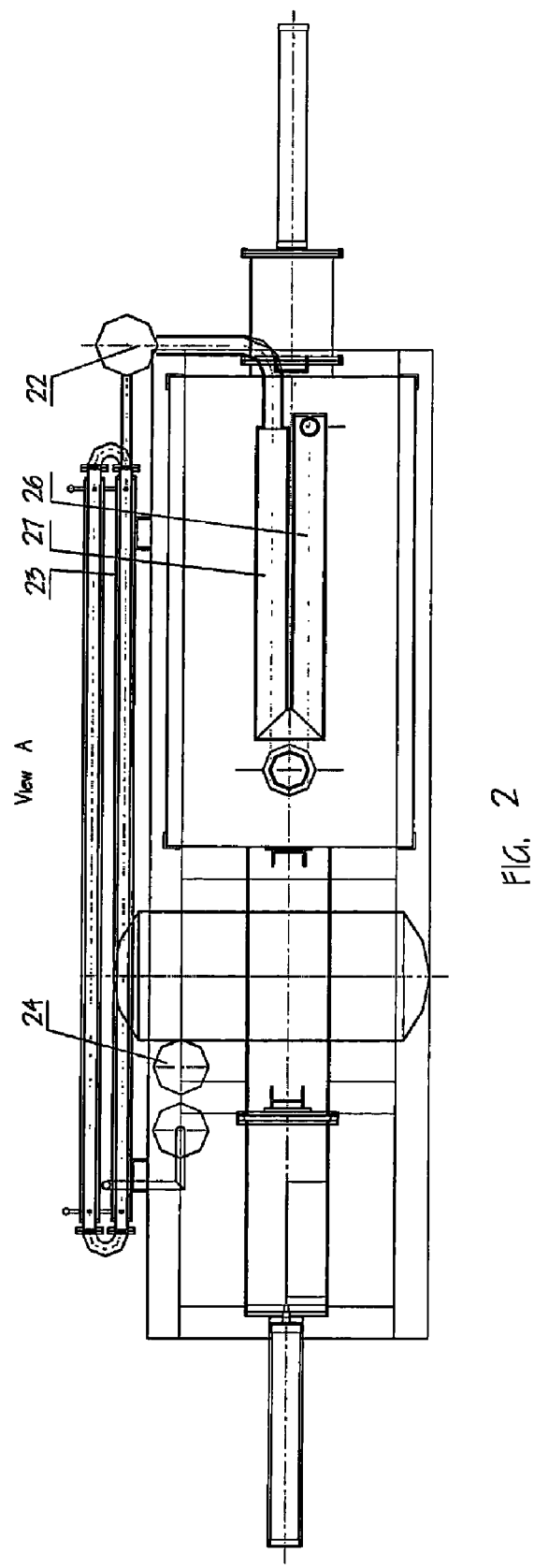
FIG. 2 is a top view of an apparatus for pyrolysis in accordance with the present invention.
Figure 3:
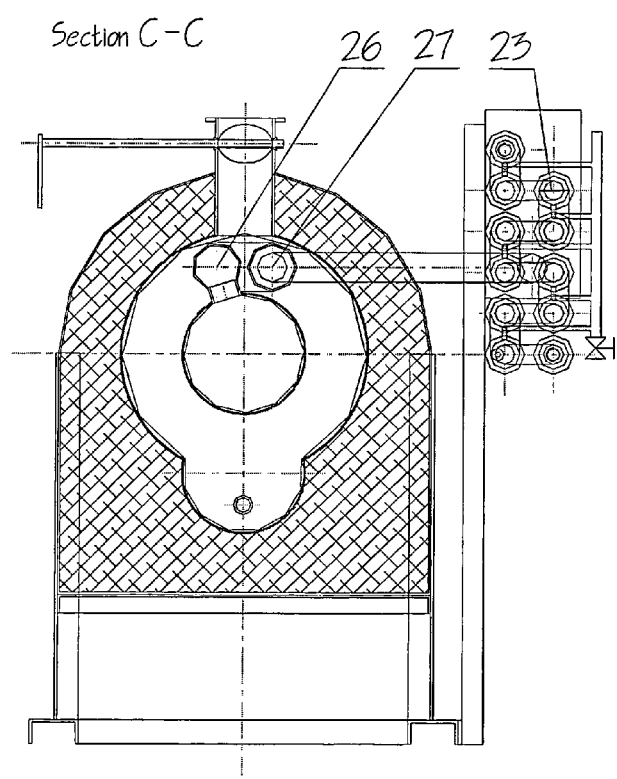
FIG. 3 is a vertical cross section of the apparatus of the invention in the area of a pyrolysis chamber.
Figure 4:
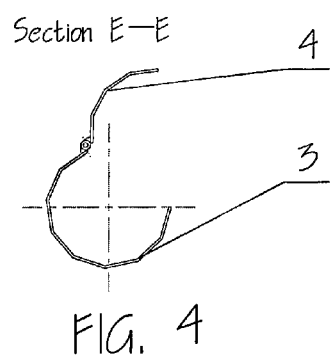
FIG. 4 is a view showing a cover of a receiving chamber of the apparatus for pyrolysis.
Figure 5:
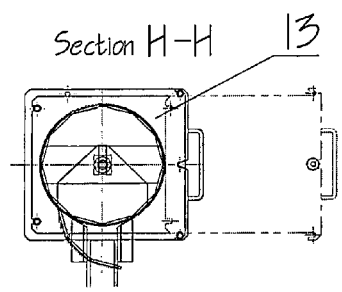
FIG. 5 is a view showing a section H-H of the apparatus for pyrolysis.
Figure 6:
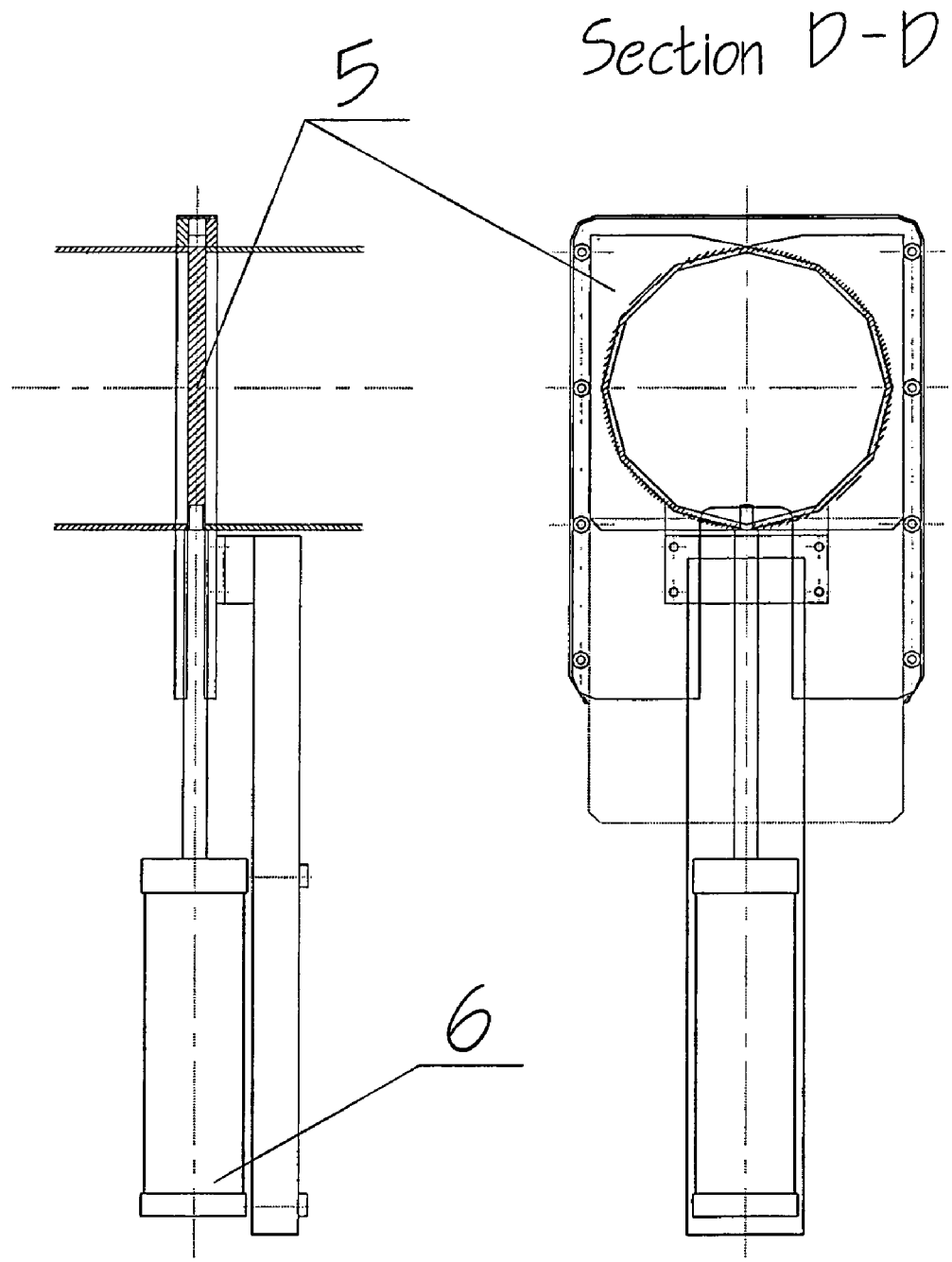
FIGS. 6a and 6b are a front view and a side view of section D-D of the apparatus for pyrolysis.
Figure 7:
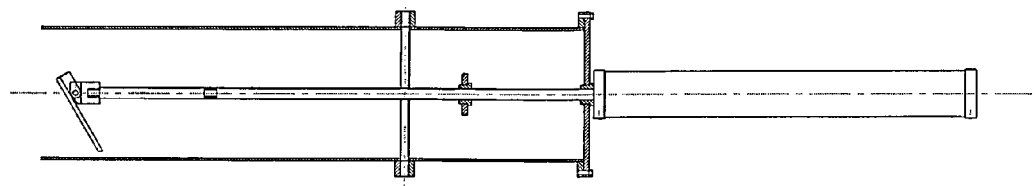
FIGS. 7a-7c are views showing different t position of means for removing residues from the apparatus for pyrolysis.
Figure 7:
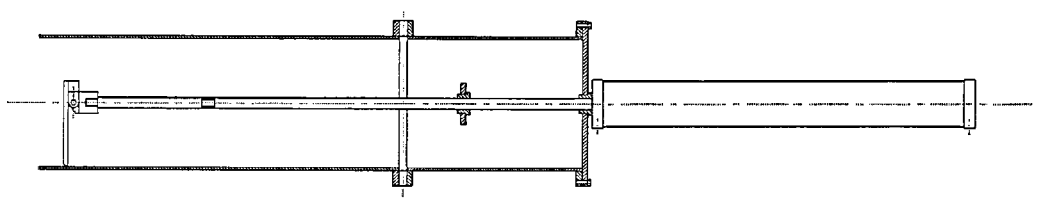
Figure 7:
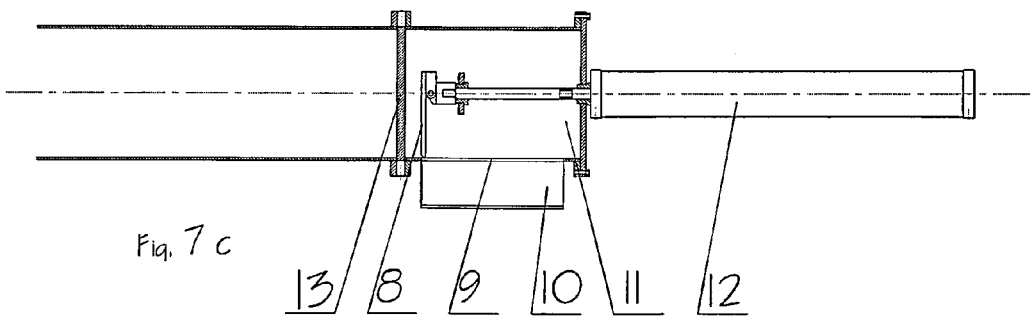
Figure 8A:
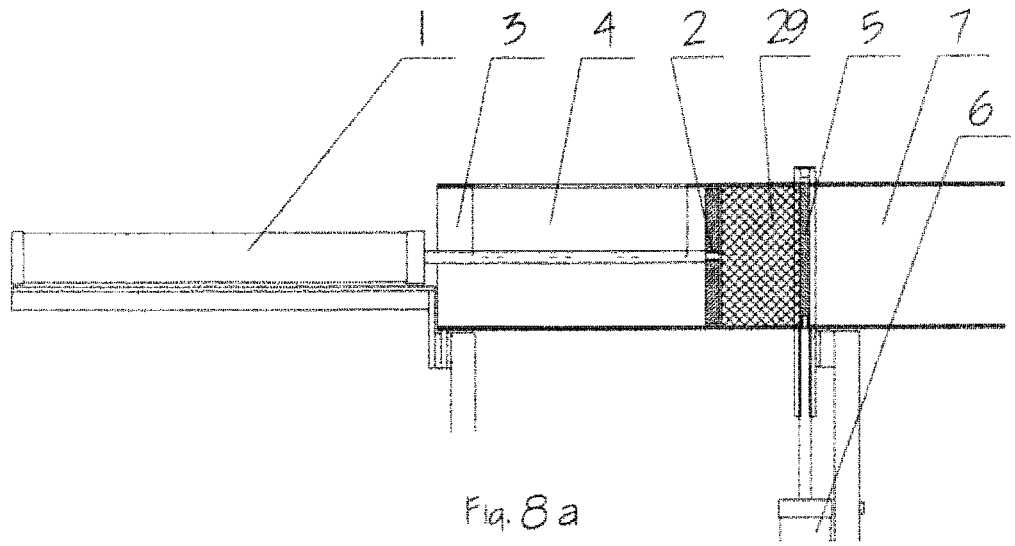
FIGS. 8a-8c are views showing different position of means for compressing a material and displacing the formed compact body of the apparatus.
Figure 8B:
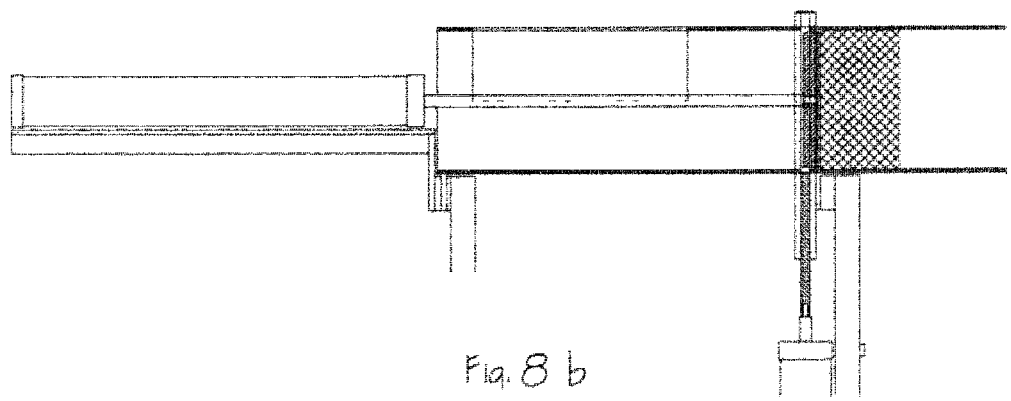
Figure 8C:
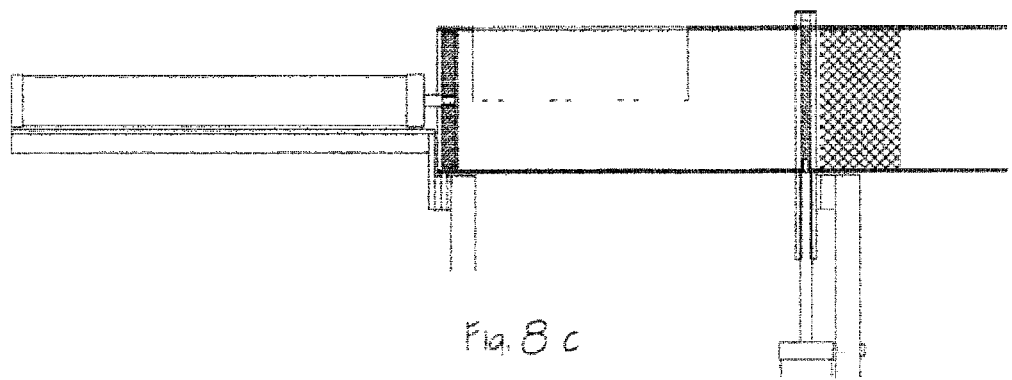

An apparatus for pyrolysis in accordance with the present invention has a receiving chamber 3 with a window for charging of material which is closeably by a cover 4. A compressing means formed for example as pneumatic cylinder-piston unit 1 has a compressing plate 2 fixed on its piston rod. The apparatus has a pyrolysis chamber 7. A heating device 21 generates a flame which heat air in the space around the pyrolysis chamber so that the wall of the latter is heated.

A filter 22 is provided for filtering a gas which is produced in the pyrolysis chamber during the pyrolysis process. A refrigerator is provided for cooling the pyrolysis gas and producing a liquid pyrolysis product which is supplied through a valve 24 and can be stored in a container 23. For withdrawing resides formed during pyrolysis a withdrawing chamber 11 is provided and has a window with an openable cover 10. A displacing means forming for example as pneumatic cylinder-piston unit 12 has a piston rod which displaces a scooping member 8. A moveable partition separates the pyrolysis chamber 7 from the withdrawing chamber 11.

In the beginning of the pyrolysis chamber a device 20 for receiving a condensate producing during drying of the material is arranged. It can be formed as a small receptacle with a lower wall provided with a plurality of openings through which the condensate passes.

The inventive apparatus for pyrolysis operates in the following manner.

The cover 4 is opened and the material is introduced into the receiving chamber 3. The cylinder-piston unit 1 is activated and its piston rod is displaced horizontally to the right so as to compress the material between the plate 2 and the closed separating means formed for example as a partition 5 so that a compact body is formed. Then the partition 5 is opened by the piston rod of the cylinder-piston unit 6 and the thusly formed compact body 29 is displaced further into the pyrolysis chamber 7.

Since the receiving chamber 3 and the pyrolysis chamber 7 are aligned with one another to form a continuation of each other and have identical inner cross-section, during the displacement of the compact body which is in tight contact the inner surfaces of the chambers 3 and 7, neither air can penetrate from chamber 3 into the chamber 7, nor the pyrolysis gas can penetrate from the chamber 7 into the chamber 3.

Compact bodies push each other so that they are introduced consecutively into the pyrolysis chamber 7. Its wall is heated by hot air which is heated by a flame of the heating device 21. Spent air is withdrawn through the outlet pipe 28.

A pyrolysis gas is generated into the pyrolysis chamber 7 and flows from it through pipes 26 and 27 into the filter 22 where it is filtered. The pyrolysis gas can be used for desired purposes. Also it can be passed through the refrigerator 23 in which it is converted into a pyrolysis liquid and through the valves 24 supplied into the storage container 25.

The residues formed in the pyrolysis chamber 7 are withdrawn into the withdrawal chamber 11 when the further means formed for example as a vertically movable (manually) partition 8 is opened and the piston rod of the cylinder-piston 12 moves the inclined scraping element 8 horizontally first to the left, which is scraping element is then oriented vertically during a return movement of the piston rod to the right and moves the residues to the right into the chamber 10 when its cover is opened. The withdrawal of the residues takes place during pyrolysis in the pyrolysis chamber without interruption of the pyrolysis.

It will be understood that each of the elements described above, or two or more together, may also find a useful application in other types of constructions differing from the type described above.

While the invention has been illustrated and described as embodied in a device for pyrolysis, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for pyrolysis of a material, comprising a receiving chamber for receiving the material and extending horizontally in a first direction; compressing means compressing the material received in said receiving chamber so as to form a compact body and including a cylinder-piston unit with a compressing plate on a piston rod movable horizontally in said first direction; a pyrolysis chamber for subjecting the compact body to a heat treatment to generate a pyrolysis gas and extending horizontally in said first direction so that said compressing plate of said cylinder-piston unit, after moving in said receiving chamber, moves further horizontally in said first direction to enter said pyrolysis chamber and to continue moving horizontally in said first direction in said pyrolysis chamber; separating means as a partition separating said receiving chamber from said pyrolysis chamber and moveable in a second direction which is perpendicular to said first direction between a closed position in which said partition of said separating means separate said receiving chamber from said pyrolysis chamber for compressing the material received in said receiving chamber by said compressing plate and an open position in which said partition of said separating means is withdrawn and open a communication of said receiving chamber with said pyrolysis chamber horizontally in said first direction so that the compact body can move horizontally in said first direction from the former into the latter by said plate of said cylinder piston unit, said receiving chamber and said pyrolysis chamber being aligned with each other and forming a continuation of each other horizontally in said first direction with substantially identical inner cross sections, so that when the compact body transits from said receiving chamber into said pyrolysis chamber horizontally in said first direction after said partition of said separating means is withdrawn in said second direction perpendicularly to said first direction it said compact body is in tight connect contact with inner surfaces of both said chambers, which tight contact prevents a flow of a gas pyrolysis gas from said pyrolysis chamber back into said receiving chamber and a flow of air from said receiving chamber into said pyrolysis chamber.

2. A device as defined in claim 1, further comprising means for withdrawing the gas formed by the pyrolysis of the material from said pyrolysis chamber.

3. A device as defined in claim 1, further comprising refrigerating means into which the gas withdrawn from said pyrolysis chamber is supplied and in which it is converted into a pyrolysis liquid, and means for receiving the pyrolysis liquid from said refrigerating means and storing the pyrolysis liquid.

4. A device as defined in claim 1, further comprising withdrawing means withdrawing residues from said pyrolysis chamber formed in said pyrolysis chamber during pyrolysis in said pyrolysis chamber.

5. A device as defined in claim 4, wherein said
   withdrawing means includes a withdrawing chamber located downstream of said pyrolysis chamber, further separating means moveable between a closed position in which said further separating means separate said withdrawing chamber and said
   pyrolysis chamber and an open position in which said further separating means is withdrawn and a communication between said pyrolysis chamber and said withdrawing chamber is established, and cleaning means engaging the residues and moving the latter from the pyrolysis chamber into said withdrawal chamber.

6. A device as defined in claim 5, wherein said further separating means is displaceable in said second direction, while said cleaning means is displaceable in said first direction.

7. A device as defined in claim 1, further comprising vapor withdrawing means arranged in said pyrolysis chamber and receiving vapors generated during heating of the compact body in said pyrolysis chamber.

8. A device as defined in claim 1, wherein said compressing plate, said receiving chamber and said partition are formed so that when said partition is moved vertically downwardly and separates said receiving chamber from said pyrolysis chamber, said compressing plate presses the material horizontally against said partition, compresses the material, and forms said compact body.

\* \* \* \* \*